US008746914B2

(12) United States Patent
Nelson et al.

(10) Patent No.: US 8,746,914 B2
(45) Date of Patent: Jun. 10, 2014

(54) SPORTS SET THAT UTILIZE STEREOSCOPIC ILLUMINATION AND RETROREFLECTIVE MATERIALS

(76) Inventors: Webb T. Nelson, Woodinville, WA (US); Mark J. Chernick, Woodinville, WA (US)

( * ) Notice: Subject to any disclaimer, the term of this patent is extended or adjusted under 35 U.S.C. 154(b) by 234 days.

(21) Appl. No.: 13/300,514

(22) Filed: Nov. 18, 2011

(65) Prior Publication Data
US 2012/0062989 A1 Mar. 15, 2012

Related U.S. Application Data

(63) Continuation-in-part of application No. 12/786,769, filed on May 25, 2010, now Pat. No. 8,550,649.

(60) Provisional application No. 61/304,513, filed on Feb. 15, 2010.

(51) Int. Cl.
*F21V 21/084* (2006.01)

(52) U.S. Cl.
USPC .............................. 362/105; 362/230; 362/234

(58) Field of Classification Search
USPC ......... 362/103, 105, 106, 227, 230, 234, 253, 362/157, 184
See application file for complete search history.

(56) References Cited

U.S. PATENT DOCUMENTS

| | | |
|---|---|---|
| 1,688,113 A | 10/1928 | Bornkessel |
| 3,060,308 A | 10/1962 | Fortuna |
| 4,195,918 A | 4/1980 | Freche et al. |
| 4,254,451 A | 3/1981 | Cochran, Jr. |
| 4,283,127 A | 8/1981 | Rosenwinkel et al. |
| 4,991,851 A | 2/1991 | Melesio |
| 5,567,039 A | 10/1996 | Sims |
| 5,592,245 A | 1/1997 | Moore et al. |
| 5,722,762 A * | 3/1998 | Soll ............................... 362/105 |
| 6,116,744 A * | 9/2000 | Batterman .................... 362/103 |
| 6,390,640 B1 | 5/2002 | Wong et al. |
| 6,482,108 B1 | 11/2002 | McLaughlin |
| 6,535,182 B2 | 3/2003 | Stanton |
| 6,543,899 B2 | 4/2003 | Covannon et al. |
| 6,554,444 B2 | 4/2003 | Shimada et al. |
| 6,575,588 B2 | 6/2003 | Strehl |
| 6,733,150 B1 | 5/2004 | Hanley |
| D501,290 S | 2/2005 | Zuloff |
| 6,955,444 B2 | 10/2005 | Gupta |
| 7,163,309 B2 | 1/2007 | Sohn |
| 7,192,151 B2 | 3/2007 | Clupper et al. |
| 7,234,831 B1 | 6/2007 | Hanley |
| 7,438,409 B2 | 10/2008 | Jordan |
| 7,450,250 B2 | 11/2008 | Venkatesh et al. |
| 7,506,992 B2 | 3/2009 | Carter |
| 7,562,979 B2 | 7/2009 | Waters |
| 7,708,422 B2 | 5/2010 | Sohn |
| 7,945,311 B2 | 5/2011 | McCloy et al. |
| 8,550,649 B2 * | 10/2013 | Nelson et al. ................. 362/105 |
| 2006/0007671 A1 | 1/2006 | Lavoie |
| 2006/0281584 A1 | 12/2006 | Ramsay |
| 2011/0187989 A1 | 8/2011 | Waters |

* cited by examiner

*Primary Examiner* — Bao Q Truong

(74) *Attorney, Agent, or Firm* — LaMorte & Associates, P.C.

(57) ABSTRACT

A system and method of illuminating a target object even when the target object is otherwise well illuminated by ambient light. Retroreflective material is provided on the exterior of the target object. The retroreflective material is pigmented to primarily reflect light within a predetermined frequency range. An illumination assembly is provided that contains a first light source and a second light source. The first light source and the second light source produce beams of light that are perceived stereoscopically. The primary wavelength of each of the stereoscopic beams of light falls within the predetermined frequency range. When the beams of light strike the retroreflective material, the retroreflective material shines even in bright ambient light.

18 Claims, 5 Drawing Sheets

SPORTS SET THAT UTILIZE STEREOSCOPIC ILLUMINATION AND RETROREFLECTIVE MATERIALS

RELATED APPLICATIONS

This application is a continuation-in-part of U.S. patent application Ser. No. 12/786,769, entitled Stereoscopic Illumination System For Retroreflective Materials, filed May 25, 2010 now U.S. Pat. No. 8,550,649, which is a continuation-in-part of U.S. Provisional Patent Application No. 61/304,513, entitled Stereoscopic Illumination System, filed Feb. 15, 2010.

BACKGROUND OF THE INVENTION

1. Field of the Invention

In general, the present invention relates to illumination systems that include lights that are worn on or about a person's head. The present invention also relates to the use of retroreflective materials. More particularly, the present invention relates to illumination systems having spaced sources of illumination that are used to illuminate retroreflective materials.

2. Prior Art Description

Battery powered flashlights have been in existence for over a century. During this long period of time, flashlights have been configured in countless ways, including configurations that are intended to be worn on a user's head. Mounting a flashlight to a user's head has many benefits. A head-mounted flashlight automatically illuminates the area in which a person is facing. The beam of a flashlight also focuses a person's attention to the objects being illuminated by the beam of light. Furthermore, a head-mounted flashlight enables a person to have two free hands. It is for these reasons that miners use helmets with mounted lights and physicians use headbands with mounted lights. In more common applications, there are many flashlights marketed to campers and runners that have headbands that enable the flashlight to be worn on the forehead. Likewise, there are many flashlight designs that are configured to attach to the brims of hats.

Flashlights are typically designed to shine polychromatic white light in a single beam of light. The light from the flashlight illuminates everything within the range of the beam. However, due to the polychromatic nature of the light, the beam of the flashlight readily mixes with ambient light. Accordingly, the beam of a flashlight is often impossible to detect in any area that is exposed to daylight or in a space that is well lit from other ambient light sources.

It is common sense that an object can be more readily seen if that object is better illuminated than its surroundings. This is why flashlights are useful in finding objects in dark places. However, what if an object is in a well lit place where a beam of flashlight has no effect?

The present invention discloses an illumination system that can be used to illuminate targeted objects in otherwise well lit locations. The illumination system makes the targeted object brighter than other untargeted objects even in bright ambient light. This produces a broader range of peripherally reflected light, thus providing faster tracking and location finding abilities for the user. The illumination system also focuses a person's attention to the targeted object.

The details of the present invention illumination system are described and claimed below.

SUMMARY OF THE INVENTION

The present invention is a system and method for illuminating a target object in order to make it more obvious, even when that object is otherwise well illuminated by ambient light. The system uses one or more areas of retroreflective material located on the exterior of the target object. The retroreflective material is pigmented so that the retroreflective material absorbs most light and reflects only light that falls within a predetermined wavelength range.

An illumination assembly is provided that contains a first light source and a second light source. The first light source and the second light source are positioned a distance apart so that they produce stereoscopic beams of light. Each of the light sources is produced by one or more light emitting diodes. The light emitting diodes emit generally monochromatic light at any one instant of time. However, the primary wavelength of the monochromatic light can periodically change in order to create color-changing effects. The primary wavelength for each of the stereoscopic beams of light falls within the predetermined wavelength range that is reflected by the retroreflective material.

The first light source and the second light source are either mounted to a user's head near the eyes or positioned in the user's line of sight. In this manner, the stereoscopic beams of light shine in the same direction as the user's line of sight and are perceived stereoscopically. This creates peripheral reflective light that make the target object easier to find and/or track. When the stereoscopic beams of light illuminate the retroreflective material, the retroreflective material reflects the beams of light back to the user. The intensity of the reflected light is particularly strong along the user's line of sight. The retroreflective material, therefore, begins to shine brightly with reflected light, even when there is an ample supply of ambient light. As a result, any object containing the retroreflective material can be quickly found in an area simply by scanning the area with the stereoscopic beams of light and waiting for the retroreflective material to shine. The peripheral reflective light thus enables a user to experience a wider viewing angle and added visual range. The result is that the target object is much easier to track, even when the target object is moving. The increased reflective peripheral viewing angle also creates an additional perceived optical effect of leaving a residual trail of light from fast moving objects such as sports balls, pucks, darts, arrows, and projectiles. This allows for easier tracking during play. The residual trail of light also is a stunning visual effect that adds to the play value of many sport and novelty items.

Additional visual effects can be produced by using color changing and or blinking LEDs. Incorporating blinking LEDs into the system can add the additional effect of an enhanced strobe motion to an object even within a lighted environment. The blinking light can also be used to animate holographic or colored offset images as well as create 3D animated effects. Likewise, cycling the colors within the system can create an animated effect of changing lights that cause the optical illusion of leaving colored trails. These trails can be further enhanced with flashing effects.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention illumination system can be embodied in many ways, the embodiments illustrated show the system configured as sports set that comprise a head-worn illumination system and a game object, such as a ball or flag. These embodiments are selected in order to set forth some of the best modes contemplated for the invention. The illustrated embodiments, however, are merely exemplary and should not be considered a limitation when interpreting the scope of the appended claims.

Figure 1:
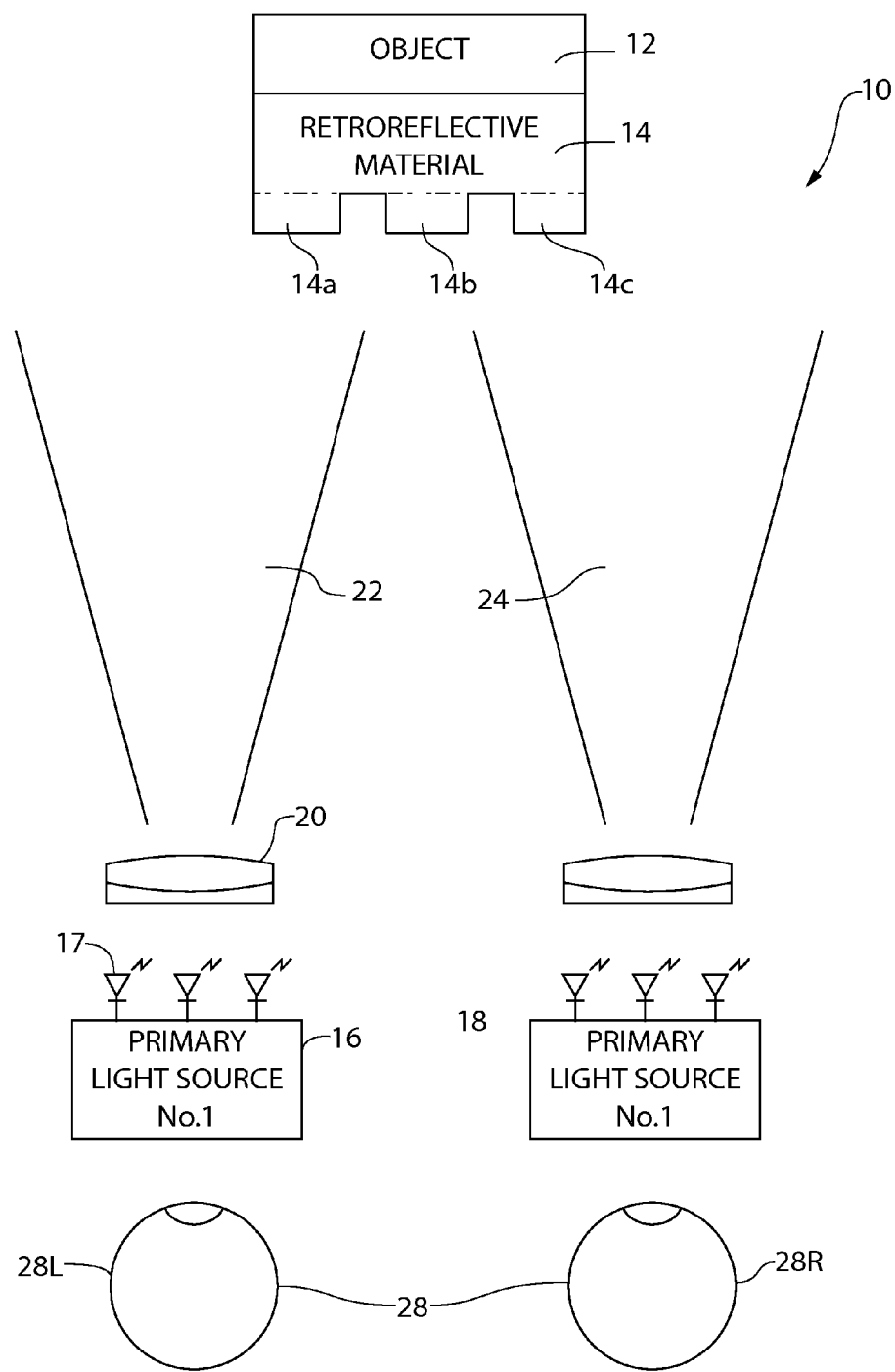
FIG. 1 is an exemplary schematic of the present invention illumination system.

Referring to FIG. 1, a general operational schematic of the present invention illumination sports set 10 is shown in order to illustrate the functionality of the sports set 10. Some physical embodiments of the sports set 10 that utilize the operational schematic are later presented in the embodiments of FIG. 4, FIG. 5, and FIG. 6.

In the shown schematic of FIG. 1, an object 12 is shown. The object 12 is preferably a sports ball or projectile, such as a baseball, football, tennis ball, soccer ball, ping pong ball, shuttle cock or the like. Alternatively, the object 12 can be anything that needs to be intensely visually tracked in a game, such as a target for a toy shooting game, a flag in a capture-the-flag game, or a hidden prize in a hide-and-seek game. Regardless of the functional nature of the object 12, the object 12 has an exterior surface containing one or more areas 14*a*, 14*b*, 14*c* of retroreflective material 14.

Retroreflective materials are widely commercially available. Retroreflective material uses micro-prisms or reflective spherical beads that are bound in a polymer. The polymer can be clear. However, the polymer is often pigmented to provide the retroreflective surface with a particular color. For instance, retroreflective traffic stop signs are pigmented red so that they appear to reflect back red light.

Most any such available retroreflective material can be used as part of the present invention. However, it is preferred that each 14*a*, 14*b*, 14*c* of retroreflective material 14 be specifically pigmented in a different color so that they have their highest reflectivity at different light wavelengths. Pigmented retroreflective material absorbs some light energy in the color wavelengths outside the pigmentation. However, pigmented retroreflective materials reflect nearly all the incoming light having the same color wavelengths as the pigmentation. For the purpose of this specification, it should be understood that each area 14*a*, 14*b*, 14*c* of retroreflective material 14 is most reflective to light frequencies within a predetermined wavelength range (PWR). Since there are three areas 14*a*, 14*b*, 14*c* of retroreflective material 14 in the example, and each has a different pigmentation, it will be understood that the retroreflective material 14 will primarily reflect light in three distinct wavelength ranges.

Two primary light sources 16, 18 are provided. Each of the light sources 16, 18 are preferably small arrays of light emitting diodes 17. However, other light sources, such as laser light sources can also be used. The two light sources 16, 18 each have three LEDs 17 in the illustrated example. Each of the LEDs 17 in each of the light sources 16, 18 emits a different colored light. Each of the LEDs 17 emits light in a color that corresponds to one of the predetermined wavelength ranges (PWR) of the areas 14*a*, 14*b*, 14*c* of the retroreflective material 14. The two light sources 16, 18 contain LEDs 17 of the same colors. As will later be explained in more detail, the two light sources 16, 18 emit light of the same color at the same moments in time.

As has been stated, each area 14*a*, 14*b*, 14*c* of retroreflective material 14 reflect light best in a predetermined wavelength range (PWR). The predetermined wavelength range (PWR) has a bandwidth that is preferably less than 50 nms wide. The preferred range for green light ranges between 510 nm and 560 nm. However, a predetermined wavelength range (PWR) of less than 10 nm would also work.

Optional objective elements 20 may be used to help focus the light from the light sources 16, 18 into controlled beams of light 22, 24. The objective elements 20 can take the form of lenses, fiber optic conduits or other collimator assemblies. The objective elements 20 need not be provided if the beams of light 22, 24 generated by the light sources 16, 18 are adequately confined to beams through the structure of the LEDs 17 or through the use of contoured reflectors (not shown).

The beams of light 22, 24 propagate away from the light sources 16, 18 along generally parallel paths. It is preferred that the light beams 16, 18 be confined so that the spread of the beams 16, 18 do not overlap by more than fifty percent at any distance less than at least three feet in front of the light sources 16, 18.

It will be understood that the average person has two eyes 28 and that the center of those eyes are typically spaced between 2.5 and 3.5 inches apart. This ocular spacing averages just under 3 inches in adults and about 2.6 inches in children. The two primary light sources 16, 18 are positioned either above or below the center of each eye 28. Consequently, the two primary light sources 16, 18 are spaced between 2.5 and 3.5 inches apart. By positioning the two primary light sources 16, 18 in such a manner, the person viewing the beams of light 22, 24 views the two beams of light 22, 24 stereoscopically. That is, each of the beams of light 22, 24 is in-line with the line of sight from each eye 28. Consequently, to the user, two beams of light 22, 24 are not seen. Rather, the optical illusion of a single beam of light is observed.

Retroreflective material is designed to reflect light back in the same direction from which it arrives regardless of the angle of incidence between the incoming light and the retroreflective material. However, the intensity of the reflected light is directly proportional to the angle of incidence. For retroreflective material, the coefficient of retroreflective luminance $R_L$ is the ratio of luminance in the direction of observation $R_A$, to the cosine of the angle of observation (A). This is expressed as:

$$R_L = \frac{R_A}{\cos A}$$

Figure 2:
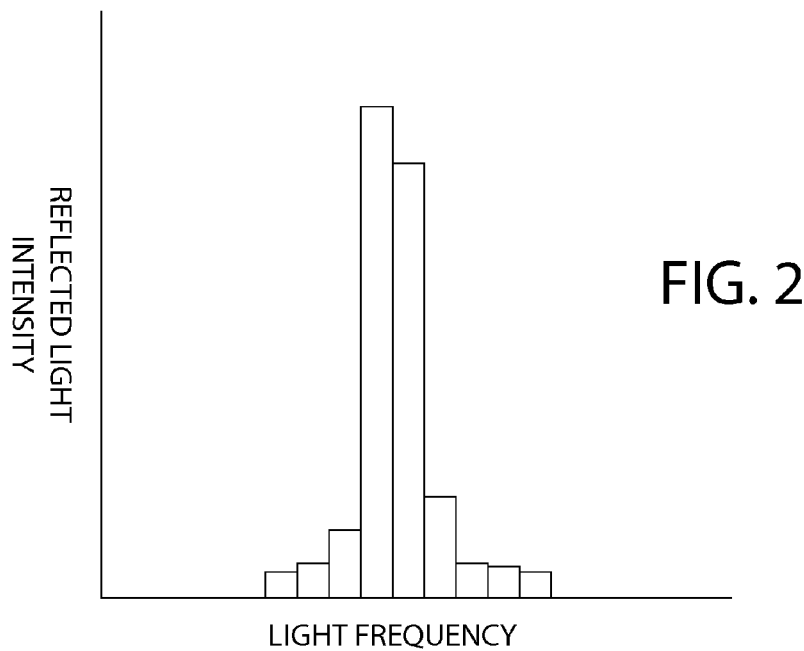
FIG. 2 is a graph showing the intensity of reflected light received by a user's left eye.
Figure 3:
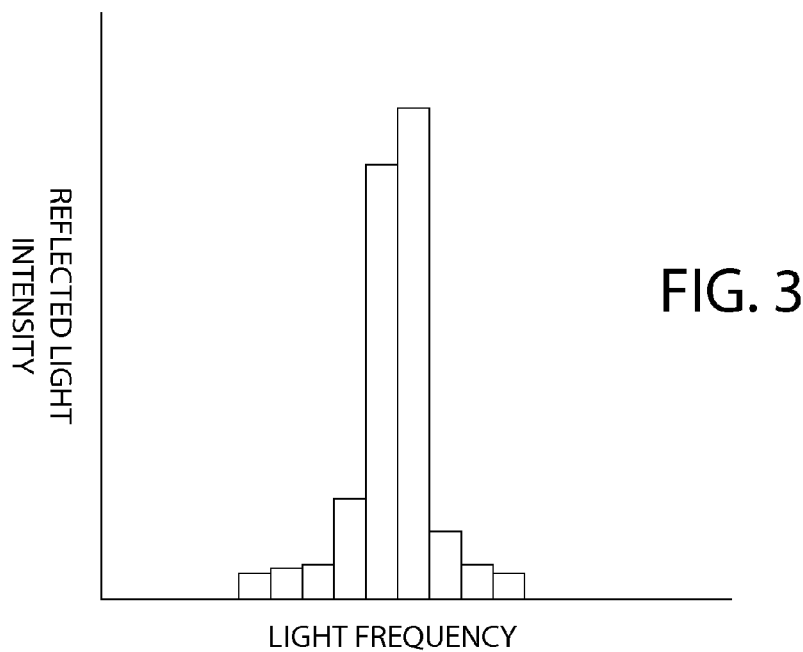
FIG. 3 is a graph showing the intensity of reflected light received by a user's right eye.

It will therefore be understood that the intensity of the light reflected by the retroreflective material 14 is most intense when the retroreflective material 14 is observed directly in line with a beam of light such that the angle of incidence is zero and the cosine of the angle of incidence is one. In the application of the present invention, there are two beams of light 22, 24 that are created by the two primary light sources 16, 18. Each beam of light 22, 24 reflects from the retroreflective material 14. Referring to FIG. 2 in conjunction with FIG. 1, it can be seen that the first eye 28L receives the most reflected light from the first beam of light 22 that is in line with the line of sight for that eye 28L. The intensity of the light reflected from the beam of light 22 aligned with eye 28L is slightly greater than the reflected light received from the second beam of light 24 because of the difference in the angle of incidence between the first beam of light 22 and the second beam of light 24. However, the intensity of the reflected light from both beams 22, 24 is far greater than the intensity of reflected ambient light. Likewise, referring to FIG. 3 in conjunction with FIG. 1, it can be seen that the second eye 28R receives the most reflected light from the second beam of light 24 that is in line with the line of sight for the second eye 28R. The intensity of the light reflected from the beam of light 24 aligned with the second eye 28R is slightly greater than the reflected light received from the first beam of light 22 because of the difference in the angle of incidence between the first beam of light 22 and the second beam of light 24. However, the reflected light from both beams 22, 24 is far greater than the intensity of reflected ambient light.

The brain receives images from the two eyes 28 simultaneously and perceives the information from the two eyes as a single image. The result is that the brain superimposes the intensity information contained in both FIG. 2 and FIG. 3. The result is a reflection intensity to the person aligned with the light sources 16, 18 that is over twice as bright as the reflected ambient light. Furthermore, the reflection intensity perceived by a person aligned with the light sources 16, 18 is far greater than what would be perceived by any other observer who is not aligned with the light sources 16, 18. This is because of the greater angle of incidence between the beams of light and the user's line of sight.

Referring back solely to FIG. 1, it will be understood that as a user moves his/her head, the intensity of the reflected light peaks dramatically when the beams of light 22, 24 are directly aligned with the retroreflective material 14. This phenomenon makes searching for an object 12 containing retroreflective material 14 very easy. To perform a search, a person need only align the light sources 16, 18 with his/her eyes 28L, 28R. Both the eyes 28L, 28R and the light sources 16, 18 are then moved in unison to visually scan a search area. If a retroreflective material 14 is present within the search area, that retroreflective material 14 will brightly shine with reflected light the moment that the beams of light 22, 24 impinge upon the retroreflective material 14. The retroreflective material 14 will also appear to glow in the color being emitted by the light sources 16, 18, since the retroreflective material 14 is engineered to reflect those particular wavelengths of light. The result is that the retroreflective material 14 shines brightly in an easily perceived color the moment a person's eyes 28 are aligned with the object 12. An object 12 containing the retroreflective material 14 can therefore be readily located, just by optically scanning the general area of that object.

Figure 4:
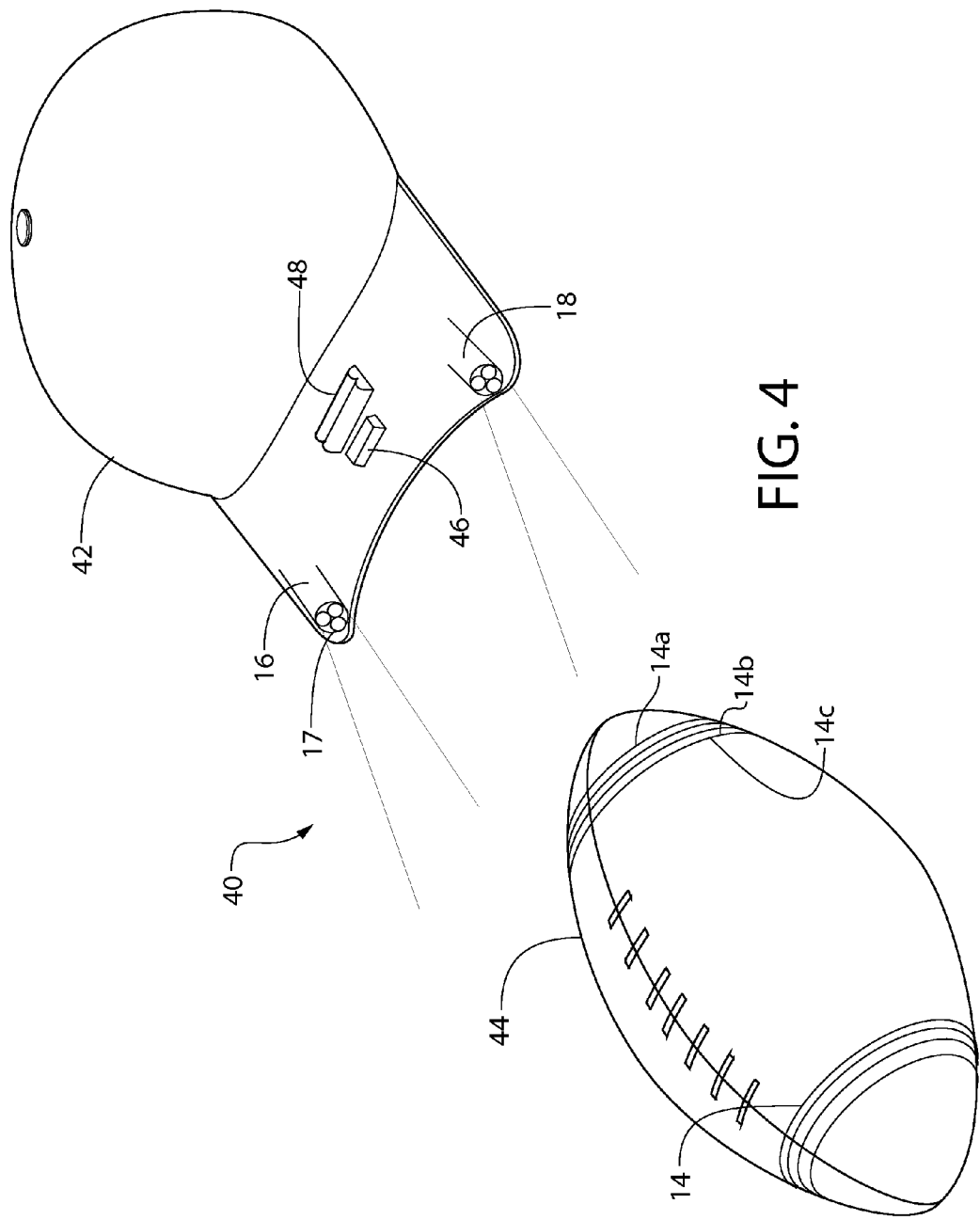
FIG. 4 is an exemplary embodiment of the present invention embodied in a first sports set that includes a hat and sports ball.

Referring to FIG. 4, a first sports set 40 is shown. The sports set 40 includes a sports hat 42 and a sports ball 44. The hat 42 and ball 44 are preferably commonly themed. For instance both the ball 44 and the hat 42 can carry the insignia of the same professional sports team. The sports set 40 is a physical embodiment of the general schematic referenced in FIG. 1. Accordingly, the same reference numbers will be used to reference the same elements.

In the shown embodiment, the ball 44 is a football. Such a ball 44 is intended to be exemplary of all sports balls, game projectiles and game targets. On the ball 44 are areas 14a, 14b, 14c of retroreflective material 14. Each area 14a, 14b, 14c of retroreflective material 14 is pigmented to primarily reflect light in a different specific wavelength, as has been previously explained with reference to FIG. 1.

Two light sources 16, 18 containing light emitting diodes (LEDs) 17 are connected to the brim of the sports hat 42. Each of the LEDs 17 emits monochromatic light. With three LEDs 17 present in each light source 16, 18, each light source 16, 18 can emit one of three colors. Each of the three areas 14a, 14b, 14c of retroreflective material 14 are pigmented in a color that matches the color of one of the colors capable of being emitted by the light sources 16, 18. It will therefore be understood that the colors produced by the LEDs 17 matches the pigmentation colors in the different areas 14a, 14b, 14c of retroreflective material 14 on the ball 44.

The LEDs 17 within the light sources 16, 18 are controlled by a common control circuit 46 and powered by a battery pack 48. The control circuit 46 causes the different LEDs 17 in each of the light sources 16, 18 to light at different times. The two light sources 16, 18 are synchronized to shine the same colored light at the same times.

Since the beams of light 22, 24 emitted by the two primary light sources 16, 18 are emitted directly over or nearly over the eyes 28, the light beams 22, 24 are stereoscopic and are visualized by the eyes 28 as being a single beam of monochromatic light.

Although the color of the light emitted by each of the light sources 16, 18 may change, at any instant of time, the light beams 22, 24 being emitted by the two primary light sources 16, 18 are monochromatic. The colored light emitted by the light sources 16, 18 are a matter of design choice. What is of primary importance is that each of the LEDs 17 emits light within the same predetermined wavelength range (PWR) at the same moments in time.

The sports ball 44 contains areas 14a, 14b and 14c of retroreflective material 14. The pigmentation of the retroreflective material 14 in the various area 14a, 14b, 14c are the same colors as the colored light emitted by the light sources 16, 18. For example, if the light sources 16, 18 emit green light at 510 nm, orange light at 490 nm and blue light at 640 nm, the pigmentation used with the areas 14a, 14b, 14c of retroreflective material 14 used on the sports ball 44 will have the corresponding colored pigmentation.

To use the sports set 40, a user wears the hat 42 and activates the light sources 16, 18. The hat 42 is oriented on the head so that the beams of light being emitted by the light sources 16, 18 on the head are above or nearly above the user's eyes. In this manner, the two emitted beams of light are perceived by the user as a single beam of light.

Once the hat 42 is in place and the light sources 16, 18 are activated, the user can throw and catch the ball 44. When the beams of light from the light sources 16, 18 intersect the ball 44, the retroreflective areas 14a, 14b, 14c on the ball 44 will appear to glow, even in daylight. The retroflective areas 14a, 14b, 14c that appears to glow will correspond in color to the color of the light being emitted by the light sources 16, 18. As the color of the light being emitted by the light sources 16, 18 changes, the areas 14a, 14b, 14c of retroreflective material 14 on the ball 44 that appears to glow will also change. As such, if the ball 44 contains retroreflective area 14a, 14b, 14c in orange, green and blue, the ball will appear to glow orange, green and blue at different times. The areas 14a, 14b, 14c of retroreflective material 14 that glows are wholly dependent upon the color of the light being emitted by the light sources 16, 18.

Figure 5:
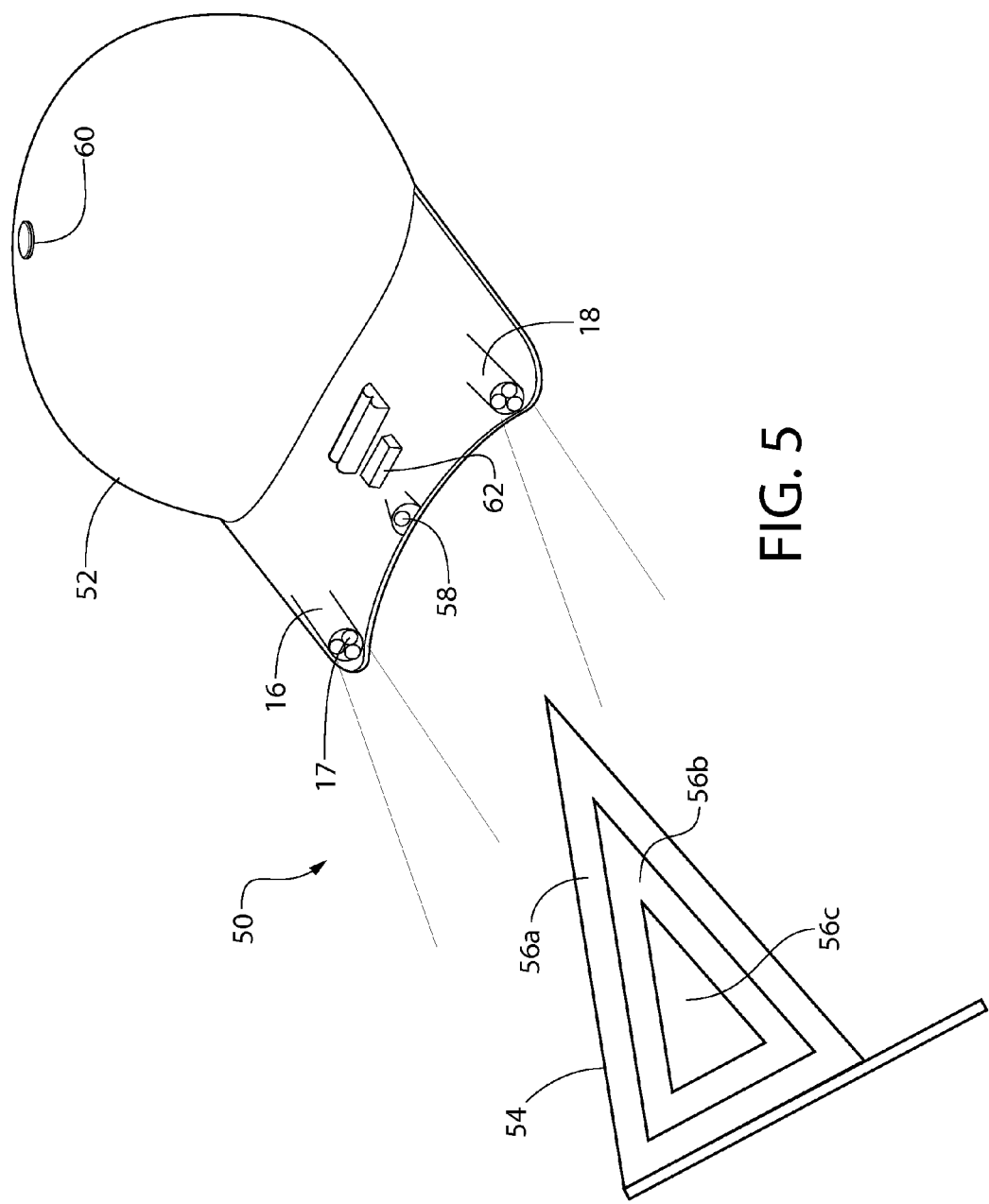
FIG. 5 is an exemplary embodiment of the present invention embodied in a second sports set that includes a hat and a flag.

Referring to FIG. 5, a second exemplary embodiment of the present invention sports set 50 is illustrated. In this embodiment, the sport set 50 is for a game like "capture the flag" where a person must find an object during the course of the game. A hat 52 is provided. The hat 52 contains two light sources 16, 18 of the same types as has been previously described. Thus, the same reference numbers are being used. Each light source 16, 18 includes LEDs 17 that light at different points in time.

A flag 54 or similar target object is provided. The flag 54 has an exterior surface containing one or more areas 56a, 56b, 56c of retroreflective material 56. Each of the areas 56a, 56b, 56c are most reflective to a different colored light produced by the LEDs 17 in the light sources 16, 18.

When the hat 52 is worn and the LEDs 17 are activated, it will be understood that the retroreflective material 56 on the flag 54 will appear to glow once it is in the line of site of both eyes and both beams of light produced by the LEDs 17. Depending upon which of the LEDs 17 are shining at the moment, different sections of the retroreflective material 56 shine the brightest.

In the embodiment of FIG. 5, a photodetector 58 is also provided. The photodetector 58 is used to trigger an activation device 60. The activation device 60 can be a light, a buzzer, a motor, or any other electromechanical device. The photodetector 58 is coupled to a control circuit 62. The control circuit 62 determines if the light received by the photodetector 58 is ambient light or light reflected from the flag 54. This is done by measuring the intensity of the primary wavelength of the reflected light and determining if that reflected light surpasses a predetermined threshold.

As has been previously explained, when light reflects from the retroreflective material 56, that light has a high reflective intensity at the wavelength of the light being shined at the retroreflective material 56. The control circuit 62 analyses the detected light to see if the reflected light is both above the predetermined threshold intensity, and if the light is a certain color. If the detected light has an unusually high intensity and it is in the color of one of the LEDs 17, then it can be accurately determined that the light sources 16, 18 are pointed at the target object 88.

It will therefore be understood that scanning games can be played. For instance, players can be given hats 52 and a flag 54 can be hidden. The first person to scan the flag 54 with the light sources 16, 18 on the hat 52 will sound a buzzer.

The control circuit 62 may only trigger the activation device 60 for one of the colors produced by the LEDs 17. In this manner, a person would have to locate the flag 52 and keep it in the beams of the LEDs 17 for a full color change cycle before the activation device 60 will trigger. This adds an element of chance to a variety of games.

Figure 6:
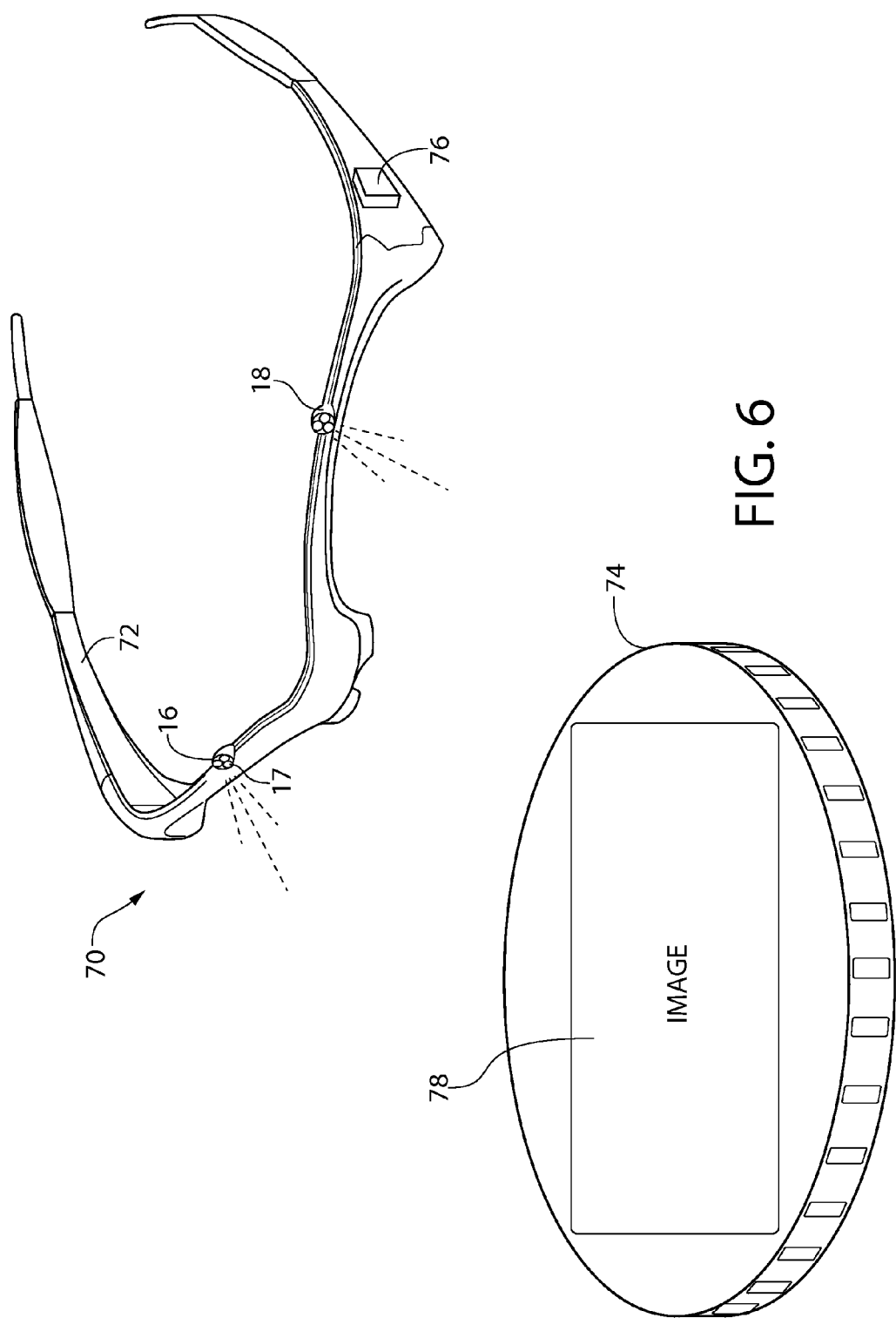
FIG. 6 is a schematic of another exemplary embodiment of a sports set that includes a pair of glasses and a flying disc.

Referring to FIG. 6, another sports set 70 is shown. In this embodiment, a set of glasses 72 is provided with a flying disc 74. The glasses 72 contain two light sources 16, 18 that operate in the manner previous described. As such, the same reference numbers are being used. The light sources 16, 18 contain LEDs 17 of different colors that light at different times. The lighting of the LEDs 17 are controlled by a control circuit 76.

In the previous embodiments, the control circuits provided changed the color of the LEDs 17 once or twice every few seconds to produce a simple color changing effect. In this embodiment, the control circuit 76 has two functions. The control circuit 76 can change the color of the LEDs 17 every second or two for normal play. Additionally, the control circuit 76 can also flash the light sources 16, 18 at a very high flash rate, such as between 4 times and 40 times per second. This flashing is capable of producing a strobe effect.

Lenticular images 78 are printed on the disc 74. Each stage of the lenticular image 78 can be printed using colors that correspond to the colors being flashed by the LEDs 17. If subsequent images are printed in different colors, the flashing of the light sources 16, 18 can cause the lenticular images 78 to appear to move. The flashing of the colored light sources 16, 18 can therefore cause two-dimensional lenticular images 16, 18 to appear to self animate. Furthermore, if the light sources 16, 18 are flashed rapidly enough using superimposed images of different colors, the flashing light can cause two-dimensional images to appear to be three-dimensional.

It will be understood that the embodiments of the present invention that are illustrated and described are merely exemplary and that a person skilled in the art can make many variations to those embodiments. For instance, the target object can be a reflective vest on a dog and need not be a sports object per se. Likewise the target object can be secret messages printed in a colorful page of a book and need not be a hidden object or a moving target. The light sources can be mounted to the head or mounted to any object that can be aligned with the head. All such embodiments are intended to be included within the scope of the present invention as defined by the claims.

What is claimed is:

1. A method of illuminating at least part of a target object, said method comprising the steps of:
   providing a first area of a first retroreflective material on said target object, wherein said first retroreflective material is pigmented to primarily reflect light in a first wavelength range;
   providing an area of a second retroreflective material on said target object, wherein said second retroreflective material is pigmented to primarily reflect light in a second wavelength range;
   providing an illumination assembly having a first light source and a second light source that produce beams of light of a first color, wherein said beams of light are colored in said first wavelength range;
   positioning said first light source and said second light source proximate a user's eyes so that a user can perceive said beams of light stereoscopically; and
   directing said beams of light onto said target object, wherein said first retroactive material reflects said beams of light back toward the user, therein causing said target object to appear brightly illuminated.

2. The method according to claim 1, wherein said step of providing an illumination assembly having a first light source and a second light source includes providing a first light source and a second light source that produce beams of light in both said first color and a second color at different times, wherein said beams of light in said second color are colored in said second wavelength range.

3. The method according to claim 2, further including the step of providing an area of a third retroreflective material on said target object, wherein said third retroreflective material is pigmented to primarily reflect light in a third wavelength range.

4. The method according to claim 3, wherein said step of providing an illumination assembly having a first light source and a second light source includes providing a first light source and a second light source that produce beams of light in said first color, said second color, and a third color at different times, wherein said beams of light in said third color are colored in said third wavelength range.

5. The method according to claim 1, wherein said step of providing an illumination assembly having a first light source and a second light source includes providing a first light source and a second light source both containing arrays of light emitting diodes.

6. The method according to claim 1, wherein said step of positioning said first light source and said second light source proximate a user's eyes includes providing a head mounting for both said first light source and said second light source, wherein said head mounting is selected from a group consisting of eyeglass frames, headbands, and hats.

7. The system according to claim 1, further including the step of providing optical elements that focus said beams of light.

8. The method according to claim 6, further including the step of providing a photodetector circuit on said head mounting for determining when light reflected from said first retroreflective material exceeds a predetermined threshold level.

9. The method according to claim 8, further including the step of providing an indicator on said head mounting that is activated by said photodetector circuit.

10. The method according to claim 2, further including the step of flashing said first light source and said second light source.

11. A method of illuminating a target object, comprising the steps of:
   providing a first area of retroreflective material on said object that is pigmented in a first color;
   providing an area of a second retroreflective material on said target object, wherein said second retroreflective material is pigmented to primarily reflect light in a second color;
   providing a first light source capable of producing a first beam of light in said first color;
   providing a second light source capable of producing a second beam of light in said first color, wherein said first light source and said second light source are mounted to a common support and wherein said first beam of light and said second beam of light shine in a common direction;
   orienting a user's eyes with said first beam of light and said second beam of light by positioning the user's eyes proximate said common support and orienting a user's line of sight with said common direction;
   moving said common direction and said line of sight in unison until both said first beam of light and said second beam of light simultaneously illuminate said target object and said first area of retroreflective material reflects said first beam of light and said second beam of light back along said line of sight.

12. The method according to claim 11, wherein said first light source and said second light source produce beams of light in both said first color and said second color at different times.

13. The method according to claim 12, wherein said beams of light periodically change color in unison.

14. The method according to claim 13, wherein said beams of light flash in a synchronized manner.

15. The method according to claim 11, further including the step of detecting the intensity of light that is reflected back towards said first light source and said second light source by said first area of retroreflective material.

16. The method according to claim 11, further including the step of affixing said common support to the head of a user.

17. A method of illuminating a sports ball, said method comprising the steps of:
   providing a first area of a first retroreflective material on said sports ball, wherein said first retroreflective material is pigmented to primarily reflect light in a first wavelength range;
   providing an area of a second retroreflective material on said sports ball, wherein said second retroreflective material is pigmented to primarily reflect light in a second wavelength range;
   wearing an illumination assembly on a user's body, said illumination assembly having a first light source and a second light source that produce beams of light of a first color, wherein said beams of light are colored in said first wavelength range and wherein said beams of light are perceived stereoscopically by the user;
   directing said beams of light onto said sports ball, wherein said first retroactive material reflects said beams of light back toward the user, therein causing said sports ball to appear brightly illuminated.

18. The method according to claim 17, further including the step of periodically changing said beams of light to a second color that falls within said second wavelength range.

* * * * *